(12) United States Patent
Arigo et al.

(10) Patent No.: US 9,267,019 B2
(45) Date of Patent: *Feb. 23, 2016

(54) FUNCTIONALIZED SILICA FOR SILICA WET MASTERBATCHES AND STYRENE BUTADIENE RUBBER COMPOSITIONS

(75) Inventors: Mark Arigo, Baton Rouge, LA (US); Subir Debnath, Baton Rouge, LA (US); Jorge Soto, Baton Rouge, LA (US)

(73) Assignee: LION COPOLYMER HOLDINGS, LLC, Geismar, LA (US)

( * ) Notice: Subject to any disclaimer, the term of this patent is extended or adjusted under 35 U.S.C. 154(b) by 451 days.

This patent is subject to a terminal disclaimer.

(21) Appl. No.: 13/560,844

(22) Filed: Jul. 27, 2012

(65) Prior Publication Data
US 2012/0322925 A1  Dec. 20, 2012

Related U.S. Application Data

(63) Continuation-in-part of application No. 13/252,199, filed on Jun. 15, 2012.

(60) Provisional application No. 61/594,259, filed on Feb. 2, 2012, provisional application No. 61/497,312, filed on Jun. 15, 2011.

(51) Int. Cl.
*C08L 21/00* (2006.01)
*C08K 9/06* (2006.01)

(52) U.S. Cl.
CPC .................................. *C08K 9/06* (2013.01)

(58) Field of Classification Search
CPC .................... C08L 25/10; C08K 2003/023
USPC ....................................................... 523/334
See application file for complete search history.

(56) References Cited

U.S. PATENT DOCUMENTS

| | | | |
|---|---|---|---|
| 2,384,543 A | 9/1945 | Fryling | |
| 4,076,550 A | 2/1978 | Thurn et al. | |
| 4,076,769 A | 2/1978 | Watts | |
| 4,104,323 A | 8/1978 | Hansen | |
| 4,213,888 A | 7/1980 | Karg et al. | |
| 5,093,407 A | 3/1992 | Komai et al. | |
| 5,304,591 A | 4/1994 | Nowakowsky et al. | |
| 5,504,168 A | 4/1996 | Maestri et al. | |
| 5,763,388 A | 6/1998 | Lightsey et al. | |
| 5,985,953 A | 11/1999 | Lightsey et al. | |
| 6,197,384 B1 | 3/2001 | Schubert et al. | |
| 6,346,579 B1 | 2/2002 | Zanzig et al. | |
| 6,403,693 B2 | 6/2002 | Materne et al. | |
| 6,579,929 B1 | 6/2003 | Cole et al. | |
| 6,635,700 B2 | 10/2003 | Cruse et al. | |
| 6,921,785 B2 | 7/2005 | Campbell et al. | |
| 7,307,121 B2 * | 12/2007 | Zhang et al. | 524/502 |
| 7,335,807 B2 | 2/2008 | Hochgesang | |
| 7,585,914 B2 | 9/2009 | Tsou et al. | |
| 8,329,794 B2 * | 12/2012 | Harris et al. | 524/262 |
| 8,835,536 B2 * | 9/2014 | Debnath et al. | 523/351 |
| 2003/0097966 A1 | 5/2003 | Stephens et al. | |
| 2004/0071626 A1 | 4/2004 | Smith et al. | |
| 2005/0256267 A1 | 11/2005 | Hochgesang | |
| 2005/0277717 A1 | 12/2005 | Joshi et al. | |
| 2006/0036034 A1 | 2/2006 | Chaves et al. | |
| 2006/0100320 A1 | 5/2006 | Dalphond et al. | |
| 2007/0106024 A1 | 5/2007 | Tsou et al. | |
| 2007/0260005 A1 | 11/2007 | Karato et al. | |
| 2008/0221274 A1 | 9/2008 | Jourdain | |
| 2008/0293889 A1 | 11/2008 | Obrecht | |
| 2009/0124730 A1 | 5/2009 | Matsuda et al. | |
| 2009/0137716 A1 | 5/2009 | Furukawa et al. | |
| 2010/0022684 A1 | 1/2010 | Wallen et al. | |
| 2011/0165356 A1 | 7/2011 | Harris et al. | |
| 2011/0166262 A1 | 7/2011 | Harris et al. | |
| 2011/0166263 A1 | 7/2011 | Rikhoff et al. | |
| 2011/0166265 A1 | 7/2011 | Harris et al. | |

FOREIGN PATENT DOCUMENTS

| | | |
|---|---|---|
| CA | 1242832 | 10/1988 |
| CA | 2724798 | 1/2010 |
| JP | 2005-33019 | 12/2005 |

* cited by examiner

Primary Examiner — Hannah Pak
(74) Attorney, Agent, or Firm — Buskop Law Group, PC; Wendy Buskop

(57) ABSTRACT

A rubber composition and a tire using the rubber composition utilizing a functionalized silica dry precipitated silica with a specific surface area in the range of 100 to 300 $m^2$/gm treated with a plurality of silanes coupling agents to form a wet polymer silica masterbatch, then blending the masterbatch with a latex rubber component that includes a styrene-butadiene copolymer rubber or a blend of the styrene-butadiene copolymer rubber and another conjugated diene base rubber using a plurality of coupling agents simultaneously.

12 Claims, No Drawings

FUNCTIONALIZED SILICA FOR SILICA WET MASTERBATCHES AND STYRENE BUTADIENE RUBBER COMPOSITIONS

CROSS REFERENCE TO RELATED APPLICATIONS

The present application claims priority to and the benefit of U.S. Provisional Patent Application Ser. No. 61/594,259 filed on Feb. 2, 2012, entitled "FUNCTIONALIZED SILICA FOR RUBBER MASTERBATCH" and is a Continuation in Part of co-pending U.S. patent application Ser. No. 13/525,199 filed on Jun. 15, 2012, entitled "METHOD FOR PRODUCING HIGH SILICA LOADED POLYMERIC RUBBER COMPOSITE WITH A PRETREATED SILICA," which claims priority to U.S. Provisional Patent Application Ser. No. 61/497,312 filed on Jun. 15, 2011, entitled "METHOD FOR PRODUCING HIGH SILICA LOADED POLYMERIC RUBBER COMPOSITE WITH A PRETREATED SILICA." These references are hereby incorporated in its entirety.

FIELD

The present embodiments generally relate to a filled rubber composition formed using multiple coupling agents with silica.

BACKGROUND

A need exists for filler that can be easily incorporated into styrene-butadiene during an emulsion process.

A need exists for a silica filler that provides mixing and performance benefits as well as a resulting rubber formulation with reduced sulfur content.

A need exists for a rubber composition for use in tires formulated using an emulsion styrene butadiene rubber process with a silica masterbatch having multiple coupling agents simultaneously.

The present embodiments meet these needs.

DETAILED DESCRIPTION OF THE EMBODIMENTS

Before explaining the present formulation in detail, it is to be understood that the formulation is not limited to the particular embodiments and that it can be practiced or carried out in various ways.

The present embodiments relate to a filled rubber composition formed using multiple coupling agents with silica capable of producing a tire with improved wet skid resistance and grip performance and for assisting a vehicle in achieve at least 35 mpg.

A benefit of this formulation is that two silane coupling agents can be used with silica to reduce sulfur content in a final rubber formulation.

A benefit of this formation is that with the two silane coupling agents, a rubber is produced that has improved rolling resistance such as from 12 percent to 15 percent improve rolling resistance, as measured by tangent delta at 60 degrees Celsius.

A benefit of this formulation is that tensile strength of the final rubber is expected to improve using at least two silane coupling agents simultaneously.

Still another benefit of this formulation is that improved elongation of the resultant polymeric rubber occurs by about 10 percent.

By using at least two coupling agents simultaneously, the resultant rubber formulation for use in tires is more resilient, due to both a reduction in sulfur in the overall formulation and the usage of a second silane, which provides enhanced structural properties, such as at elevated temperatures. The presence of sulfur can be detrimental to long life in a rubber formulation.

Another benefit of this formulation is that the formulation provides a lower Mooney viscosity for the resultant composite, with the Mooney viscosity reduced by about 10 percent over formulations that contain only one silane coupling agent.

A lower Mooney viscosity results because the two different silanes, bond to two different sites, wherein one of the sites would have been seized by the sulfur.

It is expected with the final rubber formulation improved processability for the rubber composite by reducing heating times and curing times by improving compatibilization between the silica and the rubber.

Still another benefit of the unique dual silane silica masterbatch is reduced scorch for a final rubber formulation using the masterbatch. The scorch is expected to be reduced by at least 2 percent.

In this composition, dry silica can be used for forming the filled rubber.

In an embodiment, the dry silica can be powdered, pelletized, or flakes. It is important that the silica is dry, having no liquid component.

The silica can have from 4 weight percent to 8 weight percent moisture in an embodiment, and up to 10 percent moisture in other embodiments, and still be usable herein.

In embodiments where the silica is powdered, the silica can have a usable specific surface area in the range of 100 to 300 $m^2/gm$.

Usable dry silica can be HISIL™ 233 available from PPG Industries of Pittsburg, Pa. The dry silica which is not pretreated can be flakes/granular material such as HISIL™ 243 LD available from PPG Industries.

Embodiments can depict that more than two, such as three different silanes can also be added and coupled to silica by this process.

In this process, two or more silane coupling agents can be added directly to the rubber formulation in an internal mixer through dry blending and are then introduced into the rubber only after the silanes are attached onto the silica filler, such as by dry blending or by wet masterbatch process.

The mixtures of multiple coupling agents synergistically provide enhanced mechanical properties like lower rolling resistance, and enhanced tear strength.

Although silica is discussed as one of the fillers to which the multiple silanes can couple, other usable fillers can be inorganic clays to which the multiple silanes can be bound prior to introduction into the polymeric rubber, such as styrene-butadiene.

The silica in an embodiment can be a highly dispersible filler with a regular or consistent shape.

The individual silane coupling agents can contain one or more of the following functionalities; polysulfide, mercapto, thiocyanato, alkoxy, halogen, amino or none [—$CH_2$—linkages].

When used in an embodiment, the individual weight percentages for each of the two silanes can range from 0.1 percent to 99.9 percent of the total filler weight percentage in the formulation. The silane coupling agents can be from 1 weight percent to 15 weight percent of the final mastserbatch.

In an embodiment, the silane can be attached to the silica in a single, monolayer, process, such as by spraying the silane onto the silica while mixing in a ribbon mixer.

The silica with attached silanes can be added to a styrene butadiene rubber or similar polymeric rubber and form a wet polymer silica masterbatch from 40 weight percent to 90 weight percent of rubber latex; and from 1 weight percent to 40 weight percent of a functionalized silica.

Additives and other components can be added to the silica wet masterbatch by different techniques, namely:
 (i) Direct addition to the silica wet masterbatch by mixing in an internal mixer, extruder, or other compounding mixer the silica wet masterbatch with other compound ingredients, such as oil, or a carbon black as an antistatic agent, or a colorant, such as a pigment, or an additive, or an antioxidant, or combinations of these other compound ingredients;
 (ii) Addition by adding the compound ingredients to the silica pretreated with the chosen coupling agents in an internal mixer, extruder or other compounding mixer prior to forming the wet masterbatch; or
 (iii) Addition prior to rubber compounding but after the wet rubber masterbatch is formed by incorporating the silica pretreated with the chosen silane coupling blend via a wet rubber master batch process prior to compounding the rubber in an internal mixer, extruder, or other compounding mixer with other compound ingredients.

The final rubber composite can contain from 10 weight percent to 50 weight percent silica and can be used with styrene-butadiene, (SBR), synthetic rubber copolymer of acrylonitrile (ACN) and butadiene also known as Buna-N, Perbunan, (NBR).

Styrene-butadiene or styrene-butadiene rubber (SBR) is a synthetic rubber copolymer consisting of styrene and butadiene. SBR has abrasion resistance and good aging stability when protected by additives, and is widely used in tires, where it can be blended with natural rubber.

SBR can be produced by two basically different processes: the process known as solution (S-SBR) or the process known as emulsion processing.

The process of the formulation can include installing the dual coupling agents into the silica and then installing the functionalized silica into the styrene-butadiene rubber using the emulsion process.

In the solution process, the reaction is by ionic polymerization, in the emulsion polymerization case, the reaction is via free radical polymerization.

Nitrile butadiene rubber (NBR) is a family of unsaturated copolymers of 2-propenenitrile and various butadiene monomers (1,2-butadiene and 1,3-butadiene) usable herein. Although its physical and chemical properties vary depending on the polymer's composition of nitrile, this NBR form of synthetic rubber is generally resistant to oil, fuel, and other chemicals (the more nitrile within the polymer, the higher the resistance to oils but the lower the flexibility of the material.

Nitrile rubber lattices, along with other rubber compound ingredients, including other rubbers, stabilizers, extenders, and additives can be used to form the latex formulation.

The resultant material with the silica having two coupling agents, will release fewer volatile organic compounds, such as ethanol, in-part because a coupling of ethoxy groups or methoxy groups with two different silanol groups with silica, compared without silica with only one coupling agent, thereby significantly reducing the possibility of ethanol or methanol evolution.

The resultant material having the dual silane coupling on the silica in the rubber is expected to improve safety in a chemical plant making the rubber composite by reducing the presence of volatile organic compounds in the plant containing the resultant product, thereby reducing the chance of a fire or an explosion or a major incident, from a reaction with ethanol vapors.

The invention is expected to improve the American economy because the composition is expected to produce tires with improved gas mileage allowing compliance with a corporate average fleet economy (CAFE) regulation, namely 35 mpg, which allows the American consumers to save money on gasoline. This formulation will result in products that prevent fines from being levied on American car manufacturers for tire non-compliance, thereby making them more competitive in the world marketplace.

The following is more detail on the ingredients that can be used in creating the unique rubber composite.

The silica can be dry silica which is untreated.

One of the untreated silicas usable herein can be HISIL from PPG known as HISIL 233, which has the following chemical/physical properties: 113 meters squared per gram.

In another embodiment, a usable silica herein, can be a pretreated silica, such as a silica that has been modified to have the following physical and/or chemical parameters: a loss on drying ranging from about 0.1 percent to about 10 percent as determined by the Deutsches Institut Fur Normung E.V. (DIN), International Organization for Standardization (ISO) 787/2; a loss on ignition ranging from 2 percent to 25 percent as determined by the Deutsches Institut Fur Normung E.V., International Organization for Standardization (ISO) 3262/11; a methanol wettability ranging from 20 percent to 80 percent (titrated); a carbon content ranging from 1 percent to 30 percent, and a sulfur content ranging from 0.1 percent to 10 percent.

The untreated or pretreated silica used for silane coupling is envisioned to be from 10 weight percent to 40 weight percent of the final composite.

A first silane usable with the silica as a coupling agent can be an organosilicon derived from an organic silane having the structure: $Z_1Z_2Z_3Si(CH_2)_yX(CH_2)_ySiZ_1Z_2Z_3$. Within the structure, X can be a polysulfide, y can be an integer equal to or greater than 1, and $Z_1$, $Z_2$, and $Z_3$ can each be independently selected from the group consisting of hydrogen, alkoxy, halogen, and hydroxyl.

A second silane usable with the silica as a coupling agent simultaneously with the first silane, can be an organosilicon, which can be derived from an organic silane having the chemical structure

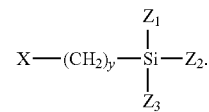

Within the chemical structure, the X can be a functional group selected from the group consisting of: hydrogen, an amino group, a polyamino alkyl group, a mercapto group, a thiocyanato group, an epoxy group, a vinyl group, a halogen, an acryloxy group, and a methacryloxy group. Within the chemical structure, the y can be an integer equal to or greater than 0. Within the chemical structure, the $Z_1$, $Z_2$, and $Z_3$ can each be independently selected from the group consisting of hydrogen, alkoxy, halogen, and hydroxyl.

The organosilicon bonds to a surface of the silica. The amount of the organosilicon that is bonded to the surface of the silica can range from about 2 weight percent to about 25 weight percent per weight of the silica.

The organosilicon can have three readily hydrolyzable groups attached directly to a silicon atom of the organosilicon.

The organosilicon can have at least one organic group attached directly to the silicon atom of the organosilicon. The organic group can contain at least one functional group.

As mentioned earlier the two different coupling agents can have different functionalities, such as one can be a mercapto, another can be a cycloalkyl. The coupling agents can be different functionalities selected from the group: polysulfide, mercapto, thiocyanato, halogen, amino, or aliphatic, aromatic, vinylic, cycloalkyl and combinations thereof.

A third silane can be added to two selected silanes for use on the silica. The third coupling agent can be an ethanol free silane, such as those from the family of NXT™ silanes available from Momentive Performance Materials of Wilton, Conn.

The third type of silane in an embodiment can have a silicon end of the molecule with silicon atoms bridged through non-volatile diols. The mercapto and blocked mercapto groups of this third silane offer different coupling reactivity with the polymer when compared to the first two mentioned silanes.

For this third silane, the mercapto group reacts with the polymer during non-productive mixing stages while the blocked mercapto group aids in the dispersion of the silica. When the octanoyl-blocking group is removed during the productive mixing stage and curing step, additional mercapto silane is formed. Proton donors can include the vulcanization ingredients, which can assist in the removal of the octanoyl blocking group for improved physical properties.

The combinations of the multiple silanes, create different couplings which increase coupling between silica and polymer but reduce sulfur presence in the formulation.

The silica can be coupled to the silane coupling agents by spraying the dry untreated or pretreated silica with the coupling agents, such as with an air carrier, or simply with pressure from a pump, in a ribbon blender or a fluidized bed.

If a ribbon blender is used, it is anticipated that the ribbon blender can mix at a rate ranging from 5 revolutions per minute to 20 revolutions per minute.

Embodiments can include forming a functionalized silica for blending with organic polymers that includes from 0.1 weight percent to 25 weight percent of a plurality of silane coupling agents simultaneously on the silica.

The plurality of silane coupling agents can be a first silane that is an organosilicon derived from an organic silane having the structure: $Z_1Z_2Z_3Si(CH_2)_yX(CH_2)SiZ_1Z_2Z_3$
wherein X is a polysulfide, wherein y is an integer equal to or greater than 1; and wherein $Z_1$, $Z_2$, and $Z_3$ are each independently selected from the group consisting of hydrogen, alkoxy, halogen, and hydroxyl.

A second silane can be an organo silane an organosilicon derived from an organic silane having the structure

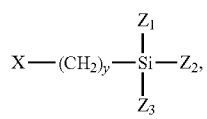

wherein: X is a functional group selected from the group consisting of: hydrogen, an amino group, a polyamino alkyl group, a mercapto group, a thiocyanato group, an epoxy group, a vinyl group, a halogen, an acryloxy group and a methacryloxy group; y is an integer equal to or greater than 0;

and $Z_1$, $Z_2$, and $Z_3$ are each independently selected from the group consisting of: hydrogen, alkoxy, halogen, and hydroxyl, and combinations thereof.

In embodiments, the resulting functionalized silica has a sulfur content ranging from 0.1 weight percent to 10 weight percent.

In embodiments, the organosilicon bonded to a surface of the silica, has three readily hydrolyzable groups attached directly to a silicon atom of the organosilicon, and has at least one organic group attached directly to the silicon atom.

In an embodiment, the organosilicon bonded to a surface of the silica has an organic group attached directly to a silicon atom of the organosilicon. The organic group contains at least one functional group.

In one or more embodiments, f a mercapto group is used in one of the silanes, the mercapto group can have a sulfur content from 0.1 weight percent to 10 weight percent.

The present embodiments relate to blending at least two different silanes and then attaching the two different silanes onto the silica forming treated silica and then further incorporating the treated silica with at least two silanes into a rubber component that includes a styrene-butadiene copolymer rubber, or a blend of the styrene-butadiene copolymer rubber, and another conjugated diene base rubbers as noted above in the description of the SBR and NBR.

The rubber can be a polymeric rubber latex which can be styrene-butadiene rubber, acrylonitrile-butadiene rubber, polyvinylchloride, acrylonitrile-butadiene-styrene polymer, carboxylated styrene butadiene, carboxylated acrylonitrile-butadiene, styrene-acrylonitrile copolymer, polybutadiene, polyisoprene, polychloroprene, neoprene, polybutadiene-isoprene, or combinations thereof.

The rubber component can also be a polymeric rubber latex of copolymers including a copolymer of: styrene and butadiene, styrene and isoprene, styrene and acrylonitrile, or butadiene and acrylonitrile.

Other additives can be added to the silica treated with the two or more silanes.

An example of a usable additive is an oil extender, such as SANDEX 8000 EU oil—which yields a final rubber formulation with a lower viscosity and improved processability.

Another additive usable herein can include antioxidants such as non-staining Nauguard RM 51 from Chemtura, or a staining antioxidant known as Santoflex 134PD from Flexsys America.

Other additives can be added into the rubber composition filled with silica having two silanes coupled thereto. An example of another usable additive is a lubricant such as wax. Other usable additives enhance cure, such as zinc oxide and stearic acid. Additionally resins, such as phenols formaldehyde can be added as a tackifier for the rubber. Still other additives include colorants and pigments such as titanium dioxide as an opacifier.

The resultant formulation can be used in the production of car tires. Formulations with staining properties can be used for tires and inner tubes, conveyor belts, footwear, cables, hosepipes and various technical rubber articles.

Non-staining grades of the composite rubber formed with the plurality of silane attached to the filler silica can include rubber appropriate for compounds used in the production of floor coverings, bicycle tires, footwear, children toys, cables, hosepipes and various rubber articles having light color shades.

In embodiments, a pretreated silica can be treated with a first silane then coupled to a second silane and then added to the latex slurry.

The rubber and the silane coupled silica slurries can then be coagulated. The coagulating agents can include: a solution of calcium chloride, zinc chloride, salts of aluminum, salts of magnesium, sulfuric acid, citric acid coagulate, ferric chloride, isopropanol, or combinations thereof.

For example, one or more embodiments can include blending calcium chloride in water to dilute from about 0.5 weight percent to about 5 weight percent of the calcium chloride in the water; thereby forming a calcium chloride solution as the coagulant.

In an embodiment, the rubber formulation can be made by adding the latex slurry to the coagulant, such as the calcium chloride solution, while continually stifling. The coagulate can be added to the latex slurry at a rate of 10 gallons a minute, with the coagulate at an ambient temperatures and the latex at 70 degrees Celsius for a time sufficient to obtain a uniform mixture as observed by visual inspection.

The formulation can be produced while allowing coagulation of the latex slurry, for about 30 seconds to about 10 minutes to form the functionalized silica loaded polymeric rubber composite.

The term "dry silica" as used herein can mean silica pretreatment by blending a dry silica with dry silane coupling agents in a blender without adding additional aqueous solution during blending and continuing to blend at a desired temperature with one or more usable catalysts.

The embodiments further relate to a wet polymer silica masterbatch formed using the silica with two silanes coupled thereto.

A wet polymer masterbatch can be made from an emulsion latex of a styrene butadiene synthetic rubber and a functionalized silica wherein the dry silica contains from 0.1 weight percent to 25 weight percent of the plurality of silane coupling agents, simultaneously.

For the wet polymer silica masterbatch an emulsion styrene butadiene rubber latex can be used with 10 weight percent to 75 weight percent of polymer molecules in water.

In an embodiment, the wet polymer silica masterbatch can include an oil extender, forming a polymer rubber composite with 1 weight percent to 35 weight percent of the functionalized silica, from 1 weight percent to 35 weight percent of the oil extender, and from 30 weight percent to 98 weight percent of the styrene butadiene rubber.

In one or more embodiments, and example of an oil extender can be SANDEX 8000 EU oil added to create a rubber composite with a low Mooney viscosity and improved processability for resultant tire formulations.

In an embodiment, the wet polymer silica masterbatch can include an antioxidant. If only an antioxidant is used, the formed polymer rubber composite can have from 1 weight percent to 35 weight percent of the functionalized silica, from 0.1 weight percent to 2 weight percent of an antioxidant, and from 67 weight percent to 99 weight percent of the styrene butadiene rein. In one or more embodiments, and example of an antioxidant can be a non-staining antioxidant, such as Nauguard™ RM 51 from Chemtura, or a staining antioxidant known as Santoflex 134PD from Flexsys America.

In one or more embodiments, the oil extender can be added to the antioxidant and then both can be added to the formulation of silanized silica in the rubber latex.

In one or more embodiments, the wet polymer silica masterbatch can include a carbon black slurry. A usable carbon black slurry can contain from 4 weight percent to 6 weight percent carbon black in water. When the carbon black slurry is used, the composition of the polymer rubber composite can be from 1 weight percent to 35 weight percent functionalized silica, from 1 weight percent to 49 weight percent of carbon black, and from 16 weight percent to 98 weight percent of the styrene butadiene producing a composite with an improved tear strength.

In one or more embodiments, the carbon black can be added to the oil extender and then added to the rubber latex.

In one or more embodiments, the carbon black can be added to the antioxidant and then added to the rubber latex prior to blending.

In one or more embodiments, the carbon black, antioxidant, and oil extender can all be blended into the latex simultaneously.

The formed composite can be used to form an article made of the polymeric rubber material, such as a retread, or a tennis or safety shoe sole.

EXAMPLE 1

Forming a Functionalized Silica by Spraying Blends of Silane onto Silica Using an Air Carrier and Mixing the Sprayed Silanes into the Silica Using a Ribbon Blender In this example, 0.35 pounds of S169 silane and 0.35 pounds of octyl triethoxysilane OTES from Gelest are stirred together in a beaker or other vessel for about 10 minutes at an ambient temperature.

Once the silanes are blended, 5 pounds of silica is placed into the ribbon blender.

0.7 pounds of the blended silanes, and 0.1 pounds of acetic acid are then sprayed over the 5 pounds of silica in the ribbon blender and then the mixture is allowed to tumble at an ambient temperature for about 1 hour in the ribbon blender.

The silanes can be sprayed into the silica using a pump which increases flow pressure by using a narrow tube with 1-2 mm diameter pin holes and a conical flow pattern.

The temperature in the ribbon blender is raised to 120 degrees Celsius and blended at the elevated temperature for 2 hours.

The blender is allowed to cool to an ambient temperature and the treated silica is discharged from the blender.

The treated silica is then weighed to produce slurry with 17 weight percent treated silica in water. The silica and water are stirred at room temperature under high shear blending conditions for about an hour.

EXAMPLE 2

Forming a Polymeric Rubber Composite Using Pretreated Silica

In this example, a slurry of silanes is created as in Example 1.

The silanes are deposited on the silica such as by spraying as described earlier.

The treated silica is then added to a carrier to make a slurry with 17 weight percent treated silica in water. The treated silica slurry is then heated forming a heated slurry.

Carbon black slurry can be added to the heated slurry. 0.2 pounds of carbon black is then mixed with water to form a carbon black slurry. 5.5 pounds of carbon black slurry is added at ambient temperatures to the heated slurry and then the carbon black heated mixture is heated to 70 degrees Celsius forming a carbon black silica heated slurry.

Separately, about 17 pounds of preheated polymer rubber latex with 21 weight percent solids is blended with 0.1 pounds non-staining antioxidant Naugard™ RM51 emulsion, and 1.3 pounds of Ergon B0300 oil emulsion are blended at a temperature of 70 degrees Celsius for a time period of 5 minutes forming a latex slurry.

The carbon black silica heated slurry is added to the latex slurry, forming a blend of two slurries.

The blend of the two slurries is mixed while maintaining a temperature of about 70 degrees Celsius for a time period of about 2 minutes until uniform mixing is achieved by visual inspection.

Coagulant is slowly added to the heated blend of two slurries changing the pH of the blend to a desired pH to provide desired coagulated crumb rubber properties.

While these embodiments have been described with emphasis on the embodiments, it should be understood that within the scope of the appended claims, the embodiments might be practiced other than as specifically described herein.

What is claimed is:

1. A wet polymer silica masterbatch comprising:
   a. from 40 weight percent to 90 weight percent of a styrene butadiene rubber latex; and
   b. from 1.0 weight percent to 40 weight percent of a functionalized silica comprising:
      (i) dry precipitated silica with a specific surface area in the range of 100 to 300 m²/gm with no liquid components;
      (ii) from 0.1 weight percent to 25 weight percent of a plurality of silane coupling agents simultaneously, wherein the plurality of silane coupling agents comprises:
      (a) a first silane is an organosilicon derived is an organosilicon derived from an organic silane having the structure: $Z_1Z_2Z_3Si(CH_2)yX(CH_2)SiZ_1Z_2Z_3$, wherein X is a polysulfide, wherein y is an integer equal to or greater than 1; and wherein $Z_1$, $Z_2$, and $Z_3$ are each independently selected from the group consisting of: hydrogen, alkoxy, halogen, and hydroxyl, and
      (b) a second silane having the structure

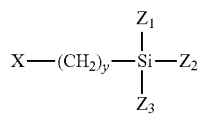

wherein:
1. X is a functional group selected from the group consisting of: a hydrogen, an amino group, a polyamino alkyl group, a mercapto group, a thiocyanato group, an epoxy group, a vinyl group, a halogen, an acryloxy group and a methacryloxy group;
2. y is an integer equal to or greater than 0; and
3. $Z_1$, $Z_2$, and $Z_3$ are each independently selected from the group consisting of: hydrogen, alkoxy, halogen, and hydroxyl, and combinations thereof; the wet polymer silica masterbatch forming rubbers with improved rolling resistance from 12 to 15 percent, a lower mooney viscosity reduced by about 10 percent from formulations containing only one silane coupling agent.

2. The wet polymer silica masterbatch of claim 1, wherein the styrene butadiene rubber latex is an emulsion styrene butadiene rubber latex with from 10 weight percent to 75 weight percent polymer molecules in water.

3. The wet polymer silica masterbatch of claim 1, wherein the styrene butadiene rubber latex comprises: natural rubber, styrene-butadiene rubber, acrylonitrile-butadiene rubber, polyvinylchloride, acrylonitrile-butadiene-styrene polymer, carboxylated styrene butadiene, carboxylated acrylonitrile-butadiene, styrene-acrylonitrile copolymer, polybutadiene, polyisoprene, polychloroprene, neoprene, polybutadiene-isoprene, or combinations thereof.

4. The wet polymer silica masterbatch of claim 1, wherein the styrene butadiene rubber latex comprises a copolymer of: styrene and butadiene, styrene and isoprene, styrene and acrylonitrile, or butadiene and acrylonitrile.

5. The wet polymer silica masterbatch of claim 1, wherein the polysulfide further comprises a sulfur content ranging from 0.1 weight percent to 10 weight percent.

6. The wet polymer silica masterbatch of claim 1, wherein the organosilicon is bonded to a surface of the silica, has three readily hydrolyzable groups attached directly to a silicon atom of the organosilicon, and has at least one organic group attached directly to the silicon atom.

7. The wet polymer silica masterbatch of claim 1, wherein the organosilicon is bonded to a surface of the silica and has an organic group attached directly to a silicon atom of the organosilicon that contains at least one functional group.

8. The wet polymer silica masterbatch of claim 1, wherein the mercapto group of the organic silane of the second silane has a sulfur content ranging from 0.1 weight percent to 10 weight percent.

9. The wet polymer silica masterbatch of claim 1, further comprising an oil extender, forming a polymer rubber composite with from 1 weight percent to 35 weight percent of the functionalized silica, from 1 weight percent to 35 weight percent of the oil extender, and from 30 weight percent to 98 weight percent of the styrene butadiene rubber.

10. The wet polymer silica masterbatch of claim 1, further comprising an antioxidant, forming a polymer rubber composite with from 1 weight percent to 35 weight percent of the functionalized silica, from 0.1 weight percent to 2 weight percent of an antioxidant, and from 67 weight percent to 99 weight percent of the styrene butadiene rubber.

11. The wet polymer silica masterbatch of claim 1, further comprising a carbon black slurry comprising from 4 weight percent to 6 weight percent carbon black in water, wherein the composition of the polymer rubber composite is from 1 weight percent to 35 weight percent functionalized silica, from 1 weight percent to 49 weight percent of carbon black, and from 16 weight percent to 98 weight percent the styrene butadiene.

12. The wet polymer silica masterbatch of claim 1, further comprising a third silane coupling agent, from a family of silane coupling agents, wherein silicon atoms are bridged through non-volatile diols.

* * * * *